United States Patent
Chauvet et al.

(10) Patent No.: US 11,124,584 B2
(45) Date of Patent: Sep. 21, 2021

(54) VINYLIDENE CHLORIDE POLYMER COMPOSITION COMPRISING AT LEAST ONE SORBATE ESTER

(71) Applicants: SOLVAY SA, Brussels (BE); CENTRE NATIONAL DE LA RECHERCHE SCIENTIFIQUE, Paris (FR); Université d'Aix-Marseille, Marseilles (FR)

(72) Inventors: Elodie Chauvet, Marseilles (FR); Didier Gigmes, Allauch (FR); Yohann Guillaneuf, Marseilles (FR); Agnès Chapotot, Tavaux (FR); Jérôme Vinas, Brussels (BE); Pascal Dewael, Buvrinnes (BE); Yves Vanderveken, Heverlee (BE)

(73) Assignees: Solvay SA, Brussels (BE); Centre National de la Recherche Scientifique, Paris (FR); Université d'Aix-Marseille, Marseilles (FR)

( * ) Notice: Subject to any disclaimer, the term of this patent is extended or adjusted under 35 U.S.C. 154(b) by 132 days.

(21) Appl. No.: 15/778,968

(22) PCT Filed: Nov. 25, 2016

(86) PCT No.: PCT/EP2016/078849
§ 371 (c)(1),
(2) Date: May 24, 2018

(87) PCT Pub. No.: WO2017/089563
PCT Pub. Date: Jun. 1, 2017

(65) Prior Publication Data
US 2018/0355080 A1    Dec. 13, 2018

(30) Foreign Application Priority Data
Nov. 27, 2015   (EP) .................... 15306885

(51) Int. Cl.
*C08F 14/06* (2006.01)
*B32B 27/08* (2006.01)
(Continued)

(52) U.S. Cl.
CPC .......... *C08F 14/06* (2013.01); *B32B 7/12* (2013.01); *B32B 23/08* (2013.01); *B32B 23/20* (2013.01); *B32B 27/08* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B65D 65/40* (2013.01); *C08F 14/08* (2013.01); *C08J 5/18* (2013.01); *C08K 5/101* (2013.01); *B29C 48/0018* (2019.02); *B29C 48/10* (2019.02); *B29C 48/21* (2019.02); *B29C 55/28* (2013.01); *B29K 2023/083* (2013.01); *B29K 2027/08* (2013.01); *B29K 2995/0067* (2013.01); *B29L 2031/712* (2013.01); *B32B 2250/02* (2013.01); *B32B 2250/03* (2013.01); *B32B 2250/24* (2013.01); *B32B 2250/246* (2013.01); *B32B 2250/40* (2013.01); *B32B 2307/40* (2013.01); *B32B 2307/7242* (2013.01); *B32B 2307/7244* (2013.01); *B32B 2439/00* (2013.01); *B32B 2439/46* (2013.01);
(Continued)

(58) Field of Classification Search
None
See application file for complete search history.

(56) References Cited

U.S. PATENT DOCUMENTS

| | | | | |
|---|---|---|---|---|
| 2,313,757 A | * | 3/1943 | Matheson | ............... C08L 27/08 524/314 |
| 2,554,142 A | * | 5/1951 | Grummitt | ............. C08K 5/098 524/111 |

(Continued)

FOREIGN PATENT DOCUMENTS

| | | |
|---|---|---|
| CN | 1832685 A | 9/2006 |
| EP | 879855 A1 | 11/1998 |

(Continued)

OTHER PUBLICATIONS

Sigma-Aldrich, Ethyl sorbate, accessed Oct. 29, 2019) (Year: 2019).*

Primary Examiner — Callie E Shosho
Assistant Examiner — John Vincent Lawler
(74) Attorney, Agent, or Firm — Osha Bergman Watanabe & Burton LLP

(57) ABSTRACT

The invention pertains to an improved PVDC composition including certain dienophiles qualified for food contact, which possess an optimized balance of effectiveness in preventing discoloration upon exposure to radiation, with no negative impact on the barrier properties, in particular sorbate esters of formula (I), wherein $R_1$ is a $C_1$-$C_{12}$ hydrocarbon group, preferably a $C_1$-$C_6$ alkyl group, to layers made therefrom, to multi-layer assemblies comprising the same, and to the use of said assemblies for packaging, in particular for packaging foodstuffs.

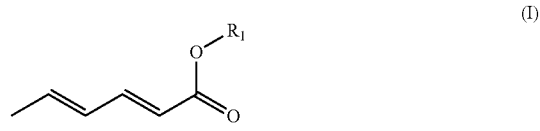

(I)

19 Claims, No Drawings

(51) Int. Cl.
  *B32B 27/30*    (2006.01)
  *B32B 27/32*    (2006.01)
  *C08K 5/101*    (2006.01)
  *C08J 5/18*     (2006.01)
  *B32B 23/20*    (2006.01)
  *B32B 23/08*    (2006.01)
  *B32B 27/36*    (2006.01)
  *B32B 27/34*    (2006.01)
  *B65D 65/40*    (2006.01)
  *B29C 48/10*    (2019.01)
  *B29C 48/00*    (2019.01)
  *B29C 48/21*    (2019.01)
  *B29C 55/28*    (2006.01)
  *B29K 23/00*    (2006.01)
  *B29K 27/00*    (2006.01)
  *B29L 31/00*    (2006.01)
  *B32B 7/12*     (2006.01)
  *C08F 14/08*    (2006.01)

(52) U.S. Cl.
  CPC ....... *B32B 2439/70* (2013.01); *B32B 2439/80* (2013.01); *C08J 2327/08* (2013.01)

(56) References Cited

U.S. PATENT DOCUMENTS

| | | | |
|---|---|---|---|
| 3,821,182 A | 6/1974 | Baird, Jr. et al. | |
| 4,127,586 A * | 11/1978 | Rody | D06M 13/35 524/84 |
| 4,640,856 A | 2/1987 | Ferguson et al. | |
| 4,657,949 A * | 4/1987 | Nace | C08K 5/09 523/137 |
| 5,051,462 A | 9/1991 | Takida et al. | |
| 5,100,721 A | 3/1992 | Akao | |
| 5,110,639 A | 5/1992 | Akao | |
| 5,679,465 A * | 10/1997 | Bekele | B32B 27/08 428/474.4 |
| 6,143,814 A | 11/2000 | Schiller et al. | |
| 6,911,242 B2 | 6/2005 | Kaas et al. | |
| 8,173,731 B2 | 5/2012 | Wegmann et al. | |
| 8,557,372 B2 * | 10/2013 | Kubik | B32B 7/12 426/133 |
| 2003/0113570 A1 * | 6/2003 | Kaas | B32B 27/18 428/518 |
| 2007/0275197 A1 * | 11/2007 | Chow | B32B 27/306 428/35.7 |
| 2013/0032756 A1 | 2/2013 | Kimura et al. | |
| 2013/0035427 A1 | 2/2013 | Kimura et al. | |
| 2013/0041086 A1 | 2/2013 | Kimura et al. | |
| 2013/0065001 A1 * | 3/2013 | Kani | B32B 1/02 428/35.7 |

FOREIGN PATENT DOCUMENTS

| | | |
|---|---|---|
| JP | 2001342361 A2 | 12/2001 |
| JP | 2004359819 A2 | 12/2004 |
| SU | 433173 A1 | 6/1974 |
| WO | 2005013704 A1 | 2/2005 |
| WO | 2013139799 A1 | 9/2013 |

* cited by examiner

VINYLIDENE CHLORIDE POLYMER COMPOSITION COMPRISING AT LEAST ONE SORBATE ESTER

CROSS-REFERENCE TO RELATED APPLICATION

This application is a U.S. national stage entry under 35 U.S.C. § 371 of International Application No. PCT/EP2016/078849 filed Nov. 25, 2016, which claims priority to European application No. EP 15306885.3 filed Nov. 27, 2015. The entire contents of these applications are explicitly incorporated herein by this reference.

TECHNICAL FIELD

The present invention relates to a vinylidene chloride polymer composition having a specific dienophile as an additive, which is suitable for the manufacture of flexible films for packaging articles therein. Furthermore, the present invention relates to a flexible film having a plurality of layers including a barrier layer having properties that prevent molecular diffusion of gases and/or vapors which is made from the said vinylidene chloride polymer composition. The specific dienophile additive comprised in the vinylidene chloride polymer composition may protect the barrier film from degradation of the film structure caused by heat, light, such as UV radiation, and/or electron beam irradiation.

BACKGROUND ART

Vinylidene chloride polymers are well known in the packaging industry for their good barrier properties, i.e. their ability to prevent penetration and diffusion therethrough of fluids, e.g., a gas (like oxygen), a vapour, a flavour molecule, etc., which are required, for instance, in the packaging and storage applications, notably for the food fields, and thus extend the shelf life of contents inside the packaging.

Barrier layers made from vinylidene chloride polymers are generally comprised in multi-layer film structures, wherein different layers cooperate to provide for a plurality of desirable properties. Hence, a barrier layer may be assembled (e.g., surrounded) by a number of other film layers, each of the layers having a plurality of characteristics. For example, an abuse layer may be provided on an outside of the film structure for adding a property that causes the film to resist tearing, scratching and/or cracking. Additionally, a sealant layer may be provided on an alternate surface of the film structure for providing a layer that may seal to itself or to other layers or articles upon heating. Further, multiple layers may be contained within the film structure having a plurality of "tie layers" or adhesive layers for bonding the internal layers, such as the barrier layer, the abuse layer, the sealant layer or any other layer within the multi-layer film structure.

Shrinkable multi-layer films having barrier properties against gases, notably oxygen, have found many useful applications in packaging of meats, cheeses, poultry, and numerous other food products as well as non-food products. There is always the need for improvement in these films to make them have better barrier properties, better abuse resistance, better tear resistance, improved clarity, and easier handling.

Multi-layer films having layers of polyolefin and vinylidene chloride polymer, possibly in combination with tie layers are known since the seventies; examples thereof are e.g. disclosed in U.S. Pat. No. 3,821,182 (W. R. GRACE) Jun. 28, 1974 or in U.S. Pat. No. 4,640,856 (W. R. GRACE) Feb. 3, 1987.

A common and well assessed technique for improving the shrink resistance and the abuse resistance of the said multi-layer films includes a step of irradiating the film so as to cross-link the polyolefin layers. The degree of cross-linking depends on the polymer type and the radiation dose. One of the benefits of using irradiation for cross-linking is that the degree of cross-linking can be easily controlled by adjusting the amount of the radiation dose.

Although vinylidene chloride polymers (PVDC or VDC polymer) are the material of choice due to their low permeability to gases and vapors such as oxygen and water vapor, these materials tend to discolor under high energy irradiation because of their inherent thermal instability.

The degradation reaction may produce HCl as a by-product along with the formation of a conjugated polyene. While the incorporation of certain ethylenically unsaturated monomers (e.g. alkyl (meth)acrylates) in the PVDC reduces the degradation process, heat and/or radiation still may cause significant degradation.

The degradation reaction is generally understood to proceed as follows:

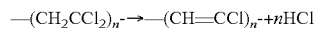

In addition to the production of hazardous by-products such as HCl, the degradation may also cause a decrease in the crystallinity of PVDC, thereby increasing the potential for gas or vapor transmission therethrough. Therefore, the radiation utilized to cause cross-linking, may lower the quality of PVDC as a barrier material.

In addition, the formation of conjugated polyenes causes a film produced by a vinylidene chloride polymer to discolor from clear to yellow. If significant degradation occurs, said PVDC film may turn brown or even black. Specifically, optical properties of the film are greatly reduced due to the degradation of vinylidene chloride polymer by heat, light or electron beam irradiation.

Techniques for stabilizing vinylidene chloride polymers, although not extensively developed, have been described in the past.

Specifically, dienophiles such as, for example, maleic anhydride and dibasic lead maleate, have been found to prevent discoloration of vinylidene chloride polymer films by reacting with the conjugated dienes and thereby stabilizing the conjugated dienes which otherwise may impart color within the polymer. Dienophiles generally stabilize these conjugated polyenes by reacting with their double bonds in multiple Diels-Alder reactions. The reactions remove the conjugated double bonds, thereby improving the properties of the film, especially its optical clarity. A further advantage of using a dienophile is that HCl remains within the film and hence slows the progress of the reaction.

However, formulations of PVDC with dienophiles besides the ones mentioned above have rarely been utilized up to this point.

Within this frame, U.S. Pat. No. 5,679,465 (W. R. GRACE) Dec. 21, 1997 teaches using a dienophile that is a copolymer having an anhydride moiety. Specifically, U.S. Pat. No. 5,679,465 discloses a terpolymer having olefinic, acrylic, and anhydride comonomers, including an ethylene/alkyl acrylate/maleic anhydride terpolymer, or a grafted copolymer of maleic anhydride as a dienophile.

In order to overcome the difficulties of using copolymeric additives, possibly interfering with the crystallinity of the vinylidene chloride polymer film matrix, U.S. Pat. No.

6,911,242 (PECHINEY EMBALLAGE FLEXIBLE EUROPE) Jun. 28, 2005 provides for a flexible film including a layer of PVDC comprising certain dienophiles having generic maleate structure ($R_1OOCCH$=$CHCOOR_2$) or the generic cinnamate structure ($C_6H_5$—CH=CH—COOR), and specifically recommends the use of ethyl trans-cinnamate, methyl trans-cinnamate, dibutyl maleate, dimethyl maleate, and maleic anhydride.

Within this scenario, a continuous need exists for an improved PVDC formulation having dienophiles incorporated therein for flexible film packaging that will react with conjugated polyenes formed by the degradation of PVDC by heat, light and electron beam irradiation so as to minimize yellowing/darkening, while still ensuring barrier properties to be maintained, and possessing favourable environmental/food contact profile.

SUMMARY OF INVENTION

The present invention hereby provides for an improved PVDC composition including certain dienophile compounds qualified for food contact, which possesses an optimized balance of effectiveness in preventing discoloration upon exposure to radiation, with no negative impact on the barrier properties.

The invention hence provides for a composition [composition (C)] comprising:
 a vinylidene chloride polymer [VDC polymer]; and
 from 0.05 to 5% by weight (wt %), with respect to the weight of VDC polymer, of at least one sorbate ester [sorbate (I)] of formula (I):

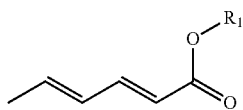

wherein $R_1$ is a $C_1$-$C_{12}$ hydrocarbon group, preferably a $C_1$-$C_6$ alkyl group.

The Applicants have surprisingly found that sorbate esters of formula (I), i.e. ester derivatives of a α,β γ,δ poly-unsaturated carboxylic acid are particularly effective in preventing discoloration of VDC polymer upon exposure to radiation, without negatively affecting permeability towards gases, in particular oxygen, and yet possess food contact qualification for use in food packaging.

Another object of the invention is a layer [layer (B)] made from the composition (C), as above detailed.

Still another object of the invention is a multi-layer assembly [assembly (A)] comprising at least one layer (B), as above detailed, said layer (B) being assembled to at least one additional layer.

Yet another object of the invention is a package made from the assembly (A), as above detailed.

The expressions "vinylidene chloride polymer," "VDC polymer," and "PVDC are used herein as synonyms to designate a polymer of which at least 50 wt % of recurring units are derived from vinylidene chloride, with respect to the total weight of PVDC. Typically, the amount of recurring units derived from vinylidene chloride in the vinylidene chloride polymer varies from 50 to 99.5 wt %, preferably from 60 to 98 wt %, more preferably from 82 to 96 wt %, and most preferably from 85 to 95 wt % of the PVDC.

The vinylidene chloride homopolymer is hardly processible and generally copolymers are deemed to be as more commercially important, while emulsion and suspension polymerisation being the preferred industrial manufacturing processes. Vinylidene chloride polymer hence generally comprises recurring units derived from at least one additional ethylenically unsaturated monomer copolymerisable with vinylidene chloride, e.g., methyl acrylate, for the purpose of having better processability and fine-tuning the performance of interest.

Non-limiting examples of at least one ethylenically unsaturated monomer copolymerisable with vinylidene chloride that can be used include, for instance, vinyl chloride; vinyl esters, such as vinyl acetate; vinyl ethers; acrylic acids, their esters and amides; methacrylic acids, their esters and amides; acrylonitrile; methacrylonitrile; styrene; styrene derivatives, such as styrene sulfonic acid and its salts; vinyl phosphonic acid and its salts; butadiene; olefins, such as ethylene and propylene; itaconic acid, and maleic anhydride.

Preferably, the said ethylenically unsaturated monomer copolymerisable with vinylidene chloride is selected from the group consisting of vinyl chloride, maleic anhydride, itaconic acid, styrene, styrene derivatives, and the acrylic or methacrylic monomers corresponding to the below general formula:

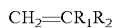
$CH_2$=$CR_1R_2$ wherein $R_1$ is chosen from hydrogen and —$CH_3$ and $R_2$ is chosen from —CN and —$COR_3$, wherein $R_3$ is chosen from —OH and —$OR_4$, wherein $R_4$ is a $C_1$-$C_{18}$ linear or branched alkyl group optionally bearing one or more —OH groups, a $C_2$-$C_{10}$ epoxy alkyl group and a $C_2$-$C_{10}$ alkoxy alkyl group, and wherein $R_3$ is also chosen from the —$NR_5R_6$ radicals, in which $R_5$ and $R_6$, same or different, are chosen from hydrogen and $C_1$-$C_{10}$ alkyl groups, optionally bearing one or more —OH groups.

More preferably, the said ethylenically unsaturated monomer copolymerisable with vinylidene chloride is selected from the group consisting of vinyl chloride, maleic anhydride, itaconic acid, the acrylic or methacrylic monomers selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, and N,N-di(alkyl)acrylamide.

Even more preferably, the said ethylenically unsaturated monomer copolymerisable with vinylidene chloride is selected from the group consisting of maleic anhydride, itaconic acid, the acrylic or methacrylic monomers selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, and N,N-di(alkyl)acrylamide.

Most preferably, the said ethylenically unsaturated monomer copolymerisable with vinylidene chloride is selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, and N,N-di(alkyl)acrylamide.

Typically, the amount of recurring units derived from the said ethylenically unsaturated monomer copolymerisable with vinylidene chloride in the vinylidene chloride polymer varies from 0.5 to 50 wt %, preferably from 2 to 40 wt %, more preferably from 4 to 18 wt %, and most preferably from 5 to 15 wt %, with respect to the total weight of VDC polymer.

A class of VDC polymers which has been found particularly useful within the frame of the present invention is the group of vinylidene chloride (VDC)/methyl acrylate (MA) copolymers, in particular VDC/MA copolymers having a weight ratio VDC/MA of 90/10 to 94/6.

A sorbate (I) which has been found particularly advantageous in the composition (C) of the present invention is ethyl sorbate of formula:

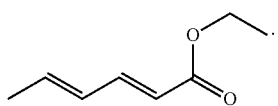

The amount of sorbate (I) in the composition (C) is generally of at least 0.05 wt %, preferably at least 0.25 wt %, more preferably at least 0.5 wt %, with respect to the weight of VDC polymer; when used in amounts below 0.05 wt %, sorbates (I) have not been found to provide adequate stabilisation against yellowing.

The amount of sorbate (I) in the composition (C) is generally of at most 5 wt %, preferably at most 4 wt %, more preferably at most 3 wt %, with respect to the weight of VDC polymer; when used in amounts exceeding 5 wt %, sorbates (I) may adversely disrupt crystallinity of VDC polymer and deteriorate the barrier properties of the said VDC polymer hosting the same.

The composition (C) may further comprise other ingredients, which may be incorporated as aids in the extrusion or blowing of the composition (C) during a film-making process. Exemplary embodiments of said ingredients are notably processing aids, antioxidants, acid scavengers, slip-agents, anti-static agents, and the like.

Embodiments wherein another thermoplastic polymer, different from the VDC polymer, is comprised in the composition (C) as an additional ingredient are also encompassed by the present invention. In these cases, the amount of the additional thermoplast is generally minor with respect to the amount of VDC polymer. Non-limitative examples of additional thermoplasts which can be combined with VDC polymer in the composition (C) are notably polyethylene (PE), ethylene-vinyl acetate copolymer (EVA copolymer), polyester, and the like.

The composition (C) generally comprises a major amount of VDC polymer, and a minor amount of all other constituents including sorbate (I) as a dienophile, as above detailed.

The amount of VDC polymer comprised in the composition (C) will be optimized in view of the expected performances; it is nevertheless understood that to the sake of optimizing the barrier properties, the amount of VDC polymer in the composition will be of at least 90 wt %, preferably at least 95 wt %, with respect to the total weight of the composition.

The composition (C) can be manufactured via standard methods for the compounding of thermoplasts; typically, the VDC polymers, the sorbate (I), and when applicable, other ingredients, are compounded together, notably in suitable mixing devices.

Generally, compounding can be realized in an extruder, by mixing the sorbate (I) with the VDC polymer, while this VDC polymer is in the molten state, by action of shear stress. According to extrusion technique, the product's profile shape of interest (e.g., geometry and size) is obtained from a die, which is designed so that molten plastic evenly flows from the barrel to the die of the extruder.

As above mentioned, another object of the invention is a layer [layer (B)] made from the composition (C), as above detailed.

The said layer (B) can be produced by any method; it is nevertheless generally preferred for the said layer (B) to be manufactured by an extrusion-blowing process. According to this technique, composition (C) is first supplied to an extruder and brought into the molten state by simultaneous action of heat and shear forces; the molten composition (C) is extruded through an annular die, and it is rapidly expanded via air pressure so that it is drawn to yield the plastic in both the transverse and draw directions. The drawing and blowing make the film become thinner than the extrudates from the annular die. The layer (B) can be used as tubing or can be slit longitudinally for providing a film.

It is nevertheless generally understood that the layer (B) made from the composition (C) typically finds use in multi-layer assemblies, wherein it acts as a barrier layer in combination with additional layers.

Hence, another object of the invention is a multi-layer assembly [assembly (A)] comprising at least one layer (B), as above detailed, said layer (B) being assembled to at least one additional layer [layer (O)].

The term "assembly" as used herein is generic to both tubing/tubular films and sheet stock, unless a contrary meaning is clearly indicated.

The said additional layers are made of polymer compositions which are suitably selected in view of their functional use, e.g. as abuse layers, as sealant layers, etc.

As exemplary materials which can be used for providing a layer (O) assembled to a layer (B) in the multi-layer assembly of the invention, mention can be made of polyolefins, in particular polyethylene, polypropylene, polybutylene; polystyrenes; cellulose esters, e.g. cellulose acetate, cellulose propionate, cellulose nitrate; polyvinyl acetate; polymethyl methacrylate, polybutyl methacrylate; polyvinyl alcohol; polyvinyl acetal; polyallyl alcohol; polyallyl acetate; polyester, e.g. polyethylene terephthalate; polyamide, e.g. nylon.

Preferred embodiments are those wherein at least one layer (O) is made from a thermoplast composition comprising a PE and/or wherein at least one layer (O) is made from a thermoplast composition comprising an EVA copolymer.

The term "polyethylene" (PE) as used herein refers to a family of resins obtained by polymerizing a gaseous hydrocarbon with the formula, $C_2H_4$, possibly in combination with minor amounts of different α-olefins (typically, 1-butene, 1-hexene, and 1-octene). By varying the catalysts and methods of polymerization, properties such as density, melt index, crystallinity, degree of branching and cross-linking, molecular weight and molecular weight distribution can be regulated over wide ranges. Polyethylene is classified into several different categories based mostly on its density and branching. Polyethylenes having densities ranging from about 0.915 g/cm$^3$ to 0.925 g/cm$^3$ are called "linear low density polyethylenes (LLDPE)". Those having densities from about 0.926 g/cm$^3$ to about 0.940 g/cm$^3$ are called "medium density polyethylenes (MDPE)", and those having densities above about 0.940 g/cm³ are called "high density polyethylenes (HDPE)". The term "very low density polyethylene (VLDPE)" as used herein means linear PE copolymers having a density ranging from 0.880 g/cm³ to 0.915 g/cm³.

Any of the aforementioned polyethylenes can be used in layer (O) as above detailed.

The term "ethylene-vinyl acetate copolymer" (EVA copolymer) as used herein refers to a copolymer formed from ethylene and vinyl acetate monomers wherein the ethylene units are present in a major amount and the vinylacetate units are present in a minor amount.

Layer (B) may be incorporated into any type of multi-layer assemblies, including flexible films created by coextrusion lamination, adhesive lamination, cast sheet extrusion, tubular water quenched extrusion, air blown extrusions or any other like film-making process.

The term "coextrusion" as used herein refers to the process of extruding two or more materials through a single die with two or more orifices arranged so that the extrudates merge and weld together into a laminar structure before quenching. That is, coextrusion refers to an extrusion of multiple layers of materials simultaneously, and is often used to apply one or more layers on top of a base material to obtain specific properties, such as UV-absorption, particular texture, oxygen permeation resistance, wear resistance, strength, and so on. The layer thicknesses are controlled by the relative speeds and sizes of the individual extruders delivering materials.

The assembly (A) is generally obtained through a co-extrusion-blowing technique, wherein a die is connected through appropriate adapters to at least one extruder conveying molten composition (C) comprising VDC polymer and at least one extruder conveying another molten thermoplast composition. The combined stream of molten compositions leave the die under the form of a multi-layer tube, in which air or a gaseous medium is inflated so as to expand the same as a bubble. Generally, it is expanded at least 2 to 2.5 times as it leaves the die, so as to achieve very thin layer thicknesses.

Multi-layer assemblies which have been found particularly advantageous are those wherein a layer (B) of composition (C) is sandwiched between an outer layer (O) and inner layer (O), possibly through the use of one or more additional adhesive layer or tie layer [layer (T)]. Exemplary embodiments are notably assemblies wherein the main constituents of the compositions used for making the layers are as follows: PE/VDC polymer/PE; PE/VDC polymer/EVA; EVA/VDC polymer/EVA; PE/adhesive layer/VDC polymer/adhesive layer/PE.

The assembly (A) of the invention is generally an oriented or heat shrinkable assembly.

An "oriented" or "heat shrinkable" assembly is defined herein as a material which, when heated to an appropriate temperature above room temperature (for example, 96° C., i.e. in hot water) will have a free shrink of 5 percent or greater in at least one linear direction.

During a typical well known method of creating shrink-wrap assemblies called the double-bubble blown film process, a multi-layer assembly including a layer (B) as above detailed may be coextruded in an annular die and air-blown to create a first bubble. The first bubble may be quenched by immersion into a cold bath. The bubble may then be collapsed and fed through a reheat bath or any other reheating method, such as, for example, infrared radiation, to be blown into a second bubble causing the multi-layer assembly to orient biaxially. The second bubble may then be collapsed and fed to a wind up cylinder. This particular method can be used for making shrink-wrap bags by maintaining the film as a collapsed tube. However, films may be made by trimming the collapsed second bubble before feeding to wind-up cylinders.

The multi-layer assembly may then be fed through an electron beam irradiation chamber for the cross-linking of polymer chains within adjacent layers of the multi-layer assembly. For example, EVA copolymer may readily cross-link to produce a layer of film having particular characteristics such as, for example, greater tensile strength.

When irradiation is applied, it can be accomplished by the use of high energy irradiation using electrons, X-rays, gamma rays, beta rays, etc. Preferably, electrons are employed of at least 10' electron volt energy. The irradiation source can be a Van de Graaff type electron accelerator, which is available in a number of types at various operating voltages and power outputs, e.g., one operated at 2,000,000 volts (V) with a power output of 500 watts (W), and 3,000,000 V and 12,000 W. Alternatively, there can be employed other sources of high energy electrons, such as the General Electric 2,000,000 V, 10 kW, resonant transformer or the corresponding 1,000,000 V, 4 kW, resonant transformer. The voltage can be between 10 kV and 1,000 kV, preferably between 50 kV and 500 kV. The irradiation is usually carried out between 10 kGy and 100 kGy, with a preferred range of 20 kGy to 60 kGy. A gray (Gy) is the SI unit of absorbed dose and specific energy (energy per unit mass), which is equivalent to 100 Rad. Irradiation can be carried out conveniently at room temperature, although higher and lower temperatures can also be applied.

Yet other object of the invention is a package made from the assembly (A), as above detailed, and the use of the assembly (A) for packaging, in particular for packaging food-stuffs.

The assemblies (A) of the present invention can be used as conventional pouches, boil-in-bag pouches, turkey bags, shrinkable pouches, grease resistant pouches, rust and/or mold inhibiting films, pouches and bags, red meat protective film, pouches and bags, moisture control films, vacuum forming raw material, window films, improved weathering films, improved abuse resistant films at a wide range of temperatures, drum and other container liners, bread wraps, wrapping for cheese, containers which are required to be resistant to gas and liquid transmission for medicine, pharmaceuticals, cosmetics, perfumes and the like, pipe line wrapping, floor tiles, bottle cap liners, e.g., crown cap liners.

Should the disclosure of any patents, patent applications, and publications which are incorporated herein by reference conflict with the description of the present application to the extent that it may render a term unclear, the present description shall take precedence.

The present invention will now be described with reference to the following examples, whose purpose is merely illustrative and not intended to limit the scope of the invention.

EXAMPLES

The following reagents were used in the Examples:

Masterbatch (M/B) of PVDC composition: VDC/MA copolymer, which has a weight ratio VDC/MA of 92/8, commercially available as PV910 TAX5A-24-01, and comprises traces of additives (from Solvay).

Dienophiles (All available from Aldrich):
Methyl trans-cinnamate (CAS No. 1754-62-7; purity 99%);
Ethyl trans-cinnamate (CAS No. 103-36-6; purity 99%);
Diethyl maleate (CAS No. 141-05-9; purity 97%);
Diethyl fumarate (CAS No. 623-91-6; purity 98%);
Diallyl maleate (CAS No. 999-21-3; purity 93%);
Ethyl sorbate (CAS No. 2396-84-1; purity ≥97%).

Manufacture of Mono-Layer Films of PVDC Incorporating Different Dienophiles:

Mono-layer films of PVDC composition were produced by extruding 98 wt % of said M/B of PVDC composition incorporating 2 wt % of a different dienophile using one extruder (D=19 mm, L/D ratio of screw=20) with a sheet die of 200×0.6 mm. On exiting the die, the films were cooled to quench and drawn, to a greater or lesser extent, in the machine direction by a 3-roll chill calender. Several films with thicknesses varying from 10 to 60 μm were produced by controlling the drawing rate of the film.

The films were treated at 40° C. in an oven for 2 days and then stored at 23° C. under 50% of relative humidity.

PVDC compositions used in the Examples are summarized in Table 1 below.

TABLE 1

| (in wt %) | Ex. 1 | Comp. Ex. 1 | Comp. Ex. 2 | Comp. Ex. 3 | Comp. Ex. 4 | Comp. Ex. 5 |
|---|---|---|---|---|---|---|
| M/B | 98 | 98 | 98 | 98 | 98 | 98 |
| Ethyl sorbate | 2 | — | — | — | — | — |
| Methyl trans-cinnamate | — | 2 | — | — | — | — |
| Ethyl trans-cinnamate | — | — | 2 | — | — | — |
| Diethyl maleate | — | — | — | 2 | — | — |
| Diethyl fumarate | — | — | — | — | 2 | — |
| Diallyl maleate | — | — | — | — | — | 2 |

Manufacture of Multi-Layer Assemblies Including a Barrier Layer Made from a Composition of PVDC Incorporating Different Dienophiles Three-layer film samples of A/B/A (A: EVA copolymer, ESCORENE® UL909 available from Exxon Mobil; B: M/B of PVDC composition available from Solvay) were produced by coextrusion using two extruders, with a feed block with several temperature zones and a sheet die of 200×0.6 mm.

On exiting of the die, the multi-layer films were similarly cooled to quench and drawn, to a greater or lesser extent, in the machine direction by a 3-roll chill calender, so as to have various thicknesses.

Irradiation of Mono-Layer and Multi-Layer Films:

Mono-layer and multi-layer films were irradiated using an electron accelerator with 20 kW power and 10 MeV by IONISOS SA. Said films were handled by computer with automatic continuous treatment by pallet layer conveyor. The radiation doses were adjusted to 30 kGy and/or 120 kGy by controlling the speed of the conveyor belt.

Yellowness Index (YI) Determination

The YI measurement of polymer films was performed according to the standard ASTM E-313 (D65 and 10°) using BYK Gardner Spectrophotometer.

For the mono-layer films, ethyl sorbate (Ex. 1) as a dienophile exhibited very outstanding YI (0.58) at 30 kGy of radiation dose, whereas diethyl maleate (Comp. Ex. 3) showed 0.97, and diethyl fumarate (Comp. Ex. 4) and diallyl maleate (Comp. Ex. 5) followed thereafter (1.37 for both).

For the coextruded multi-layer films (20 μm of PVDC and 50 μm of thickness in total), as also shown in Table 2 below, the experimental results demonstrated that ethyl sorbate (Ex. 1) of the present invention substantially contributed to the reduction of ΔYI (difference of YI before irradiation and after irradiation with 30 kGy and 120 kGy of radiation doses) of PVDC films in comparison with methyl trans-cinnamate (Comp. Ex. 1) and ethyl trans-cinnamate (Comp. Ex. 2).

TABLE 2

| | ΔYI | | |
|---|---|---|---|
| | 0 kGy Irradiation dose | 30 kGy Irradiation dose | 120 kGy Irradiation dose |
| Ex. 1 | 0 | 0.14 | 1.96 |
| Comp. Ex. 1 | 0 | 0.17 | 1.47 |
| Comp. Ex. 2 | 0 | 0.26 | 1.46 |

Oxygen Transmission Rate (OTr) Determination:

OTr measurement was performed according to ASTM D-3985, using OX-TRAN® 2/21, available from MOCON, Inc., at 23° C. and under 0% of relative humidity. Each multi-layer film was sealed between one chamber containing oxygen and the other chamber void of oxygen so that a coulometric sensor measured the oxygen transmitted through the films.

After irradiation, mono-layer films broke during OTr determination because of their brittleness. Therefore, OTr measurement was implemented only for the coextruded multi-layer films before radiation and after irradiation with 30 kGy and 120 kGy of radiation doses. The results were summarized in Table 3 below:

TABLE 3

| | Coextruded multi-layer film | | |
|---|---|---|---|
| (in $cm^3 \cdot 10$ μm/$m^2$.d.b.) | OTr (0 kGy) | OTr (30 kGy) | OTr (120 kGy) |
| Ex. 1 | 12.3 | 8.5 | 6.9 |
| Comp. Ex. 1 | 12.3 | 9.6 | 6.8 |
| Comp. Ex. 2 | 12.5 | 9.3 | 7.9 |

As demonstrated in Table 3, all the coextruded multi-layer films exhibited good performance in view of OTr after irradiation with 30 kGy and 120 kGy of radiation doses, suitable for food packaging. However, ethyl sorbate (Ex. 1) exhibited better barrier properties against oxygen.

All the experimental supporting data proved that the films prepared by using PVDC compositions of the present invention, with incorporation of at least one sorbate ester, notably ethyl sorbate as a dienophile, could provide an optimized balance of effectiveness in preventing discoloration of the films upon exposure to radiation, while still ensuring barrier properties to be maintained.

The invention claimed is:

1. A composition (C) for the manufacture of flexible films for packaging articles, comprising:
   a vinylidene chloride (VDC) polymer, wherein the amount of recurring units derived from vinylidene chloride in the VDC polymer varies from 50 to 99.5 wt %, with respect to the total weight of the VDC polymer; and from 0.05 to 3% by weight (wt %), with respect to the weight of VDC polymer, of at least one sorbate ester of formula (I):

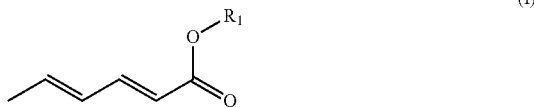

wherein $R_1$ is a $C_1$-$C_6$ hydrocarbon group.

2. The composition (C) of claim 1, wherein the VDC polymer is a copolymer comprising recurring units derived from at least one ethylenically unsaturated monomer copolymerisable with vinylidene chloride selected from the group consisting of vinyl chloride, maleic anhydride, itaconic acid, styrene, styrene derivatives, and the acrylic or methacrylic monomers corresponding to the below general formula:

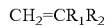

wherein $R_1$ is chosen from hydrogen and —$CH_3$ and $R_2$ is chosen from —CN and —$COR_3$, wherein $R_3$ is chosen from —OH, —$OR_4$, and —$NR_5R_6$ radicals, wherein $R_4$ is a $C_1$-$C_{18}$ linear or branched alkyl group optionally bearing one or more —OH groups, a $C_2$-$C_{10}$ epoxy alkyl group and a $C_2$-$C_{10}$ alkoxy alkyl group, and wherein $R_5$ and $R_6$, same or different, are chosen from hydrogen and $C_1$-$C_{10}$ alkyl groups, optionally bearing one or more —OH groups.

3. The composition (C) of claim 2, wherein the at least one ethylenically unsaturated monomer copolymerisable with vinylidene chloride is selected from the group consisting of maleic anhydride, itaconic acid, acrylic or methacrylic monomers selected from the group consisting of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, and N,N-di(alkyl)acrylamide.

4. The composition (C) of claim 3, wherein the at least one ethylenically unsaturated monomer copolymerisable with vinylidene chloride is methyl acrylate (MA).

5. The composition (C) of claim 4, wherein the VDC polymer has a weight ratio VDC/MA of 90/10 to 94/6.

6. The composition (C) according to claim 1, wherein said sorbate ester of formula (I) is ethyl sorbate.

7. The composition (C) according to claim 1, wherein the amount of said sorbate ester of formula (I) in composition (C) is of at least 0.25% wt, with respect to the weight of VDC polymer; and at most 3% wt, with respect to the weight of VDC polymer.

8. The composition (C) according to claim 7, wherein the amount of said sorbate ester (I) in composition (C) is of at least 0.5% wt, with respect to the weight of VDC polymer; and at most 3% wt, with respect to the weight of VDC polymer.

9. The composition (C) of claim 1, wherein the amount of recurring units derived from vinylidene chloride in the VDC polymer varies from 60 to 98 wt %, with respect to the total weight of the VDC polymer.

10. The composition (C) of claim 9, wherein the amount of recurring units derived from vinylidene chloride in the VDC polymer varies from 85 to 95 wt %, with respect to the total weight of the VDC polymer.

11. A method for manufacturing the composition (C) according to claim 1, wherein the VDC polymer and the sorbate ester of formula (I) are compounded together.

12. A layer (B) made from the composition (C), according to claim 1.

13. A method for manufacturing the layer (B) of claim 12 by extrusion-blowing process, the method comprising:
supplying the composition (C) to an extruder and bringing the composition (C) into the molten state by simultaneous action of heat and shear forces; and
extruding the the composition (C) which is molten through an annular die to form a tube, and inflating the tube with a gas as it leaves the die surface, so as to obtain the layer (B).

14. A multi-layer assembly (A) comprising at least one layer (B), according to claim 12, said at least one layer (B) being assembled to at least one additional layer (O).

15. The multi-layer assembly (A) of claim 14, wherein materials used for providing at least one layer (O) assembled to a layer (B) are selected from the group consisting of polyolefins, polyethylene, polypropylene, polybutylene; polystyrenes; cellulose esters, cellulose acetate, cellulose propionate, cellulose nitrate; polyvinyl acetate; polymethyl methacrylate, polybutyl methacrylate; polyvinyl alcohol; polyvinyl acetal; polyallyl alcohol; polyallyl acetate; polyesters, polyethylene terephthalate; polyamides, and nylon.

16. The multi-layer assembly (A) of claim 15, wherein at least one layer (O) is made from a thermoplast composition comprising a polyethylene (PE) and/or wherein the at least one layer (O) is made from a thermoplast composition comprising an ethylene-vinyl acetate copolymer (EVA).

17. The multi-layer assembly (A) of claim 14, wherein the layer (B) of the composition (C) is sandwiched between an outer layer (O) and inner layer (O), optionally through the use of one or more than one additional adhesive or tie-layer (T).

18. A method of making the multi-layer assembly (A) of claim 14, wherein the layer (B) is incorporated into an assembly created by coextrusion lamination, adhesive lamination, cast sheet extrusion, tubular water quenched extrusion, air blown extrusions or other film-making process.

19. A package made from the multi-layer assembly (A) according to claim 14, said package being selected from the group consisting of conventional pouches, boil-in-bag pouches, turkey bags, shrinkable pouches, grease resistant pouches, rust and/or mold inhibiting films, pouches and bags, red meat protective film, pouches and bags, moisture control films, vacuum forming raw material, window films, improved weathering films, improved abuse resistant films at a wide range of temperatures, drum and other container liners, bread wraps, wrapping for cheese, containers which are required to be resistant to gas and liquid transmission for medicine, pharmaceuticals, cosmetics, perfumes, pipe line wrapping, floor tiles, bottle cap liners, and crown cap liners.

* * * * *